(12) United States Patent
Xiao

(10) Patent No.: US 9,898,988 B2
(45) Date of Patent: *Feb. 20, 2018

(54) SCAN-DRIVING CIRCUIT AND TOUCH LIQUID CRYSTAL DISPLAY DEVICE

(71) Applicant: SHENZHEN CHINA STAR OPTOELECTRONICS TECHNOLOGY CO., LTD., Shenzhen (CN)

(72) Inventor: Juncheng Xiao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 337 days.

This patent is subject to a terminal disclaimer.

(21) Appl. No.: 14/891,689

(22) PCT Filed: Jul. 2, 2015

(86) PCT No.: PCT/CN2015/083160
§ 371 (c)(1),
(2) Date: Nov. 17, 2015

(87) PCT Pub. No.: WO2016/192169
PCT Pub. Date: Dec. 8, 2016

(65) Prior Publication Data
US 2017/0140727 A1 May 18, 2017

(30) Foreign Application Priority Data

Jun. 4, 2015 (CN) .......................... 2015 1 0304506

(51) Int. Cl.
*G09G 3/36* (2006.01)
*G06F 3/041* (2006.01)
*G02F 1/1333* (2006.01)

(52) U.S. Cl.
CPC ....... *G09G 3/3677* (2013.01); *G02F 1/13338* (2013.01); *G06F 3/0416* (2013.01); *G09G 2310/0291* (2013.01); *G09G 2310/08* (2013.01)

(58) Field of Classification Search
CPC ......... G09G 3/3677; G09G 2310/0291; G09G 2310/08; G02F 1/13338; G06F 3/0416
See application file for complete search history.

(56) References Cited

U.S. PATENT DOCUMENTS

2001/0013849 A1* 8/2001 Furukoshi .............. G09G 5/005
345/87
2002/0130828 A1* 9/2002 Yamazaki ............ G09G 3/3258
345/80

* cited by examiner

*Primary Examiner* — Sejoon Ahn
(74) *Attorney, Agent, or Firm* — Osha Liang LLP

(57) ABSTRACT

The present invention discloses a scan-driving circuit, which comprises a plurality of cascaded scan-driving units, a touch-driving unit, and a clock signal generator, wherein the scan-driving unit comprises a signal transfer circuit, an inverting amplifier circuit, a signal reset circuit, and an inverting logistic circuit. The present invention raises the report rate of the touch liquid crystal display device and the sensitivity of the touch-operation by a discontinuity-operation of the first clock signal and the second clock signal.

6 Claims, 3 Drawing Sheets

SCAN-DRIVING CIRCUIT AND TOUCH LIQUID CRYSTAL DISPLAY DEVICE

BACKGROUND OF THE INVENTION

Field of Invention

The present invention relates to the field of liquid crystal display technology, and more particularly to a scan-driving circuit and touch liquid crystal device.

Description of Prior Art

Touch panels have been widely applied in smart phones, tablets/electronic books, electronic notebooks, POS (point of sale)/KIOSKs, game consoles, and ATMs. In the future, the number of touch panels will quickly increase, especially in cell phones, tablets, portable media players (PMP/MP3), personal pilot devices, and other applications. Meanwhile, touch panels will have a chance to break out and grow into large-size-screen applications such as All-In-One computers.

Usually, for touch technology, the formats of driving electrodes (Tx) are divided into two kinds. One is to scan the driving electrodes at the blanking time after the display image has scanned; however, take display devices with 60 Hz, the time for scanning the driving electrodes is less than 4 ms.

Another format is to scan the driving electrodes at the gaps between the output gate signals during the column scanning procedure. In order to avoid the interference of the scan-driving signal caused by the data signals, a scanning needs to be done at the flat region of the data signal. For a high resolution product, the time required for the scan is extremely short, the width of each scan-driving signal is less than 2 µs.

Hence the scanning time of the touch scan-driving signal is shorter, which causes the report rate of the liquid display device to be lower and the sensitivity of the touch liquid display device to be poorer.

So, there is a need to provide a scan-driving circuit and touch liquid crystal device to solve the problem existing in the conventional art.

SUMMARY OF THE INVENTION

An objective of the present invention is to provide a scan-driving circuit and touch liquid crystal device with a higher report rate and also higher touch-operation sensitivity, to solve the problem of a lower report rate and lower touch-operation sensitivity in a scan-driving circuit and touch liquid crystal device of the conventional alt.

To solve the above problem, the present invention provides technical proposals as below:

The present invention provides a scan-driving circuit, which comprises a plurality of cascaded scan-driving units used to output scanning signals, a touch-driving unit being used to output a touch-driving signal, and a clock signal generator being used to transmit a first clock signal and a second clock signal, the scan-driving unit comprising:

A signal transfer circuit, for receiving a previous-one-stage cascaded signal or a next-one-stage cascaded signal, and for generating a current-stage scanning-voltage signal according to the previous-one-stage cascaded signal or the next-one-stage cascaded signal.

An inverting amplifier circuit, connected with the signal transfer circuit, for generating a current-stage cascaded signal according to the first clock signal and the current-stage scanning-voltage signal.

A signal reset circuit, connected with the inverting amplifier circuit, for performing a reboot operation to the scan-driving units according to a reboot signal.

An inverting logistic circuit, connected with the signal reset circuit and the inverting amplifier circuit, for generating a current-stage scan-driving signal according to the current-stage cascaded signal and the second clock signal;

Wherein when the touch-scanning unit outputs the touch-driving signal, the scan-driving unit stops outputting the scan-driving signal by the first clock signal and the second clock signal; when the touch-scanning unit does not output the touch-driving signal, the scan-driving unit continues to output the scan-driving signal by the first clock signal and the second clock signal;

When the scan-driving unit outputs the scan-driving signal, the clock signal generator stops a transmission of the first clock signal and the second clock signal, to stop outputting the scan-driving signal;

When the scan-driving unit stops outputting the scan-driving signal, the clock signal generator continues the transmission of the first clock signal and the second clock signal before the stop operation, to output the scan-driving signal.

The first clock signal and the second clock signal are inversed.

The present invention further provides a scan-driving circuit, which comprises a plurality of cascaded scan-driving units used to output scanning signals, a touch-driving unit being used to output a touch-driving signal, and a clock signal generator being used to transmit a first clock signal and a second clock signal, the scan-driving unit comprising:

A signal transfer circuit, used to receive a previous-one-stage cascaded signal or a next-one-stage cascaded signal, for generating a current-stage scanning-voltage signal according to the previous-one-stage cascaded signal or the next-one-stage cascaded signal.

An inverting amplifier circuit, connected with the signal transfer circuit, for generating a current-stage cascaded signal according to the first clock signal and the current-stage scanning-voltage signal.

A signal reset circuit, connected with the inverting amplifier circuit, for performing a reboot operation to the scan-driving units according to a reboot signal.

An inverting logistic circuit, connected with the signal reset circuit and the inverting amplifier circuit, for generating a current-stage scan-driving signal according to the current-stage cascaded signal and the second clock signal.

Wherein when the touch-scanning unit outputs the touch-driving signal, the scan-driving unit stops outputting the scan-driving signal by the first clock signal and the second clock signal; when the touch-scanning unit does not output the touch-driving signal, the scan-driving unit continues to output the scan-driving signal by the first clock signal and the second clock signal.

In the scan-driving driving circuit of the present invention, when the scan-driving unit outputs the scan-driving signal, the clock signal generator stops a transmission of the first clock signal and the second clock signal, to stop outputting the scan-driving signal.

In the scan-driving driving circuit of the present invention, when the scan-driving unit stops outputting the scan-driving signal, the clock signal generator continues the transmission of the first clock signal and the second clock signal prior to the stop operation, to output the scan-driving signal.

In the scan-driving driving circuit of the present invention, the signal transfer circuit generates the current-stage scanning-voltage signal according to the previous-one-stage cascaded signal and a forward scanning signal; or the signal transfer circuit generates the current-stage scanning-voltage signal according to the previous-one-stage cascaded signal and a backward scanning signal.

In the scan-driving driving circuit of the present invention, the signal transfer circuit comprises a first transmission gate and a second transmission gate, a first control terminal of the first transmission gate receives the backward scanning signal, a second control terminal of the first transmission gate receives the forward scanning signal, an input terminal of the first transmission gate receives a previous-one-stage cascaded signal, and an output terminal of the first transmission gate outputs the current-stage scan-driving signal.

A first control terminal of the second transmission gate receives the backward scanning signal, a second control terminal of the second transmission gate receives the forward scanning signal, an input terminal of the second transmission gate receives a next-one-stage cascaded signal, and an output terminal of the second transmission gate outputs the current-stage scan-driving signal.

In the scan-driving driving circuit of the present invention, the inverting amplifier circuit comprises a first inverter, a first inverting amplifier, and a second inverting amplifier.

An input terminal of the first inverter receives the first clock signal, an output terminal of the first inverter connected with a first input terminal of the first inverting amplifier, a second input terminal of the first inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

A first input terminal of the second inverting amplifier receives the first clock signal, a second input terminal of the second inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

In the scan-driving driving circuit of the present invention, the signal reset circuit comprises a first Thin Film Transistor (TFT), an control terminal of the first TFT is inputted with a reset signal, input terminal of the first TFT connects with the high constant voltage, and an output terminal of the first TFT connects with the inverting amplifier circuit and the inverting logistic circuit.

In the scan-driving driving circuit of the present invention, the inverting logistic circuit comprises a second inverter, a NAND gate, a third inverter, a fourth inverter, and a fifth inverter.

An input terminal of the second inverter connects with the signal reset circuit and the output terminal of the inverting amplifier circuit, and an output terminal of the second inverter connects a first input terminal of the NAND gate; a second input terminal of the NAND gate is inputted with the second clock signal, an output terminal of the NAND gate connects with an input terminal of the third inverter, an output terminal of the third inverter connects with an input terminal of the fourth inverter, an output terminal of the fourth inverter connects with an input terminal of the fifth inverter, and an output terminal of the fifth inverter outputs the current-stage scan-driving signal.

In the scan-driving driving circuit of the present invention, the first clock signal and the second clock signal are inversed.

The present invention further provides a touch liquid crystal display device, which comprises a scan-driving circuit, a touch panel, data lines, scanning lines, and pixel units disposed interleaved with the data lines and the scanning lines.

Wherein the scan-driving circuit comprises a plurality of cascaded scan-driving units being used to output scanning signals, a touch-driving unit being used to output touch-driving signal, and a clock signal generator being used to transmit a first clock signal and a second clock signal, the scan-driving unit comprising:

A signal transfer circuit, for receiving a previous-one-stage cascaded signal or a next-one-stage cascaded signal, and generating a current-stage scanning-voltage signal according to the previous-one-stage cascaded signal or the next-one-stage cascaded signal.

An inverting amplifier circuit, connected with the signal transfer circuit, for generating a current-stage cascaded signal according to the first clock signal and the current-stage scanning-voltage signal.

A signal reset circuit, connected with the inverting amplifier circuit, for performing a reboot operation to the scan-driving units according to a reboot signal.

An inverting logistic circuit, connected with the signal reset circuit and the inverting amplifier circuit, for generating a current-stage scan-driving signal according to the current-stage cascaded signal and the second clock signal.

Wherein when the touch-scanning unit outputs the touch-driving signal, the scan-driving unit stops outputting the scan-driving signal by the first clock signal and the second clock signal; when the touch-scanning unit does not output the touch-driving signal, the scan-driving unit continues to output the scan-driving signal by the first clock signal and the second clock signal.

In the touch liquid crystal display device of the present invention, when the scan-driving unit stops outputting the scan-driving signal, the clock signal generator continues the transmission of the first clock signal and the second clock signal before the stop operation, to output the scan-driving signal.

In the touch liquid crystal display device of the present invention, when the scan-driving unit stops outputting the scan-driving signal, the clock signal generator continues the transmission of the first clock signal and the second clock signal before the stop operation, to output the scan-driving signal.

In the touch liquid crystal display device of the present invention, the signal transfer circuit generates the current-stage scanning-voltage signal according to the previous-one-stage cascaded signal and a forward scanning signal; or the signal transfer circuit generates the current-stage scanning-voltage signal according to the previous-one-stage cascaded signal and a backward scanning signal the next-one-stage cascaded signal.

In the touch liquid crystal display device of the present invention, the signal transfer circuit comprises a first transmission gate and a second transmission gate, a first control terminal of the first transmission gate receives the backward scanning signal, a second control terminal of the first transmission gate receives the forward scanning signal, an input terminal of the first transmission gate receives a previous-one-stage cascaded signal, and an output terminal of the first transmission gate outputs the current-stage scan-driving signal.

A first control terminal of the second transmission gate receives the backward scanning signal, a second control terminal of the second transmission gate receives the forward scanning signal, an input terminal of the second transmission gate receives a next-one-stage cascaded signal, and an output terminal of the second transmission gate outputs the current-stage scan-driving signal.

In the touch liquid crystal display device of the present invention, the inverting amplifier circuit comprises a first inverter, a first inverting amplifier, and a second inverting amplifier.

An input terminal of the first inverter receives the first clock signal, an output terminal of the first inverter connects with a first input terminal of the first inverting amplifier, a second input terminal of the first inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

A first input terminal of the second inverting amplifier receives the first clock signal, a second input terminal of the second inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

In the touch liquid crystal display device of the present invention, the signal reset circuit comprises a first TFT, a control terminal of the first TFT is inputted with a reset signal, an input terminal of the first TFT connects with the high constant voltage, and an output terminal of the first TFT connects with the inverting amplifier circuit and the inverting logistic circuit.

In the touch liquid crystal display device of the present invention, the inverting logistic circuit comprises a second inverter, a NAND gate, a third inverter, a fourth inverter, and a fifth inverter.

An input terminal of the second inverter connects with the signal reset circuit and the output terminal of the inverting amplifier circuit, and an output terminal of the second inverter connects a first input terminal of the NAND gate; a second input terminal of the NAND gate is inputted with the second clock signal, an output terminal of the NAND gate connects with an input terminal of the third inverter, an output terminal of the third inverter connects with an input terminal of the fourth inverter, an output terminal of the fourth inverter connects with an input terminal of the fifth inverter, and an output terminal of the fifth inverter outputs the current-stage scan-driving signal.

In the touch liquid crystal display device of the present invention, the first clock signal and the second clock signal are inversed.

Comparing the scan-driving circuit and touch liquid crystal device of the present invention with a scan-driving circuit and a touch liquid crystal device of conventional art, the scan-driving circuit and touch liquid crystal device of the present invention raises the report rate of the touch liquid crystal display device and the sensitivity of the touch-operation, by a discontinuity-operation of the first clock signal and the second clock signal, solving the technical problem of lower report rate and lower touch sensitivity of the scan-driving circuit and touch liquid crystal device of the conventional art.

In order to make the above description more easily understood, below are embodiments with accompany drawings and a detailed explanation.

DETAILED DESCRIPTION OF THE PREFERRED EMBODIMENTS

Figure 1:
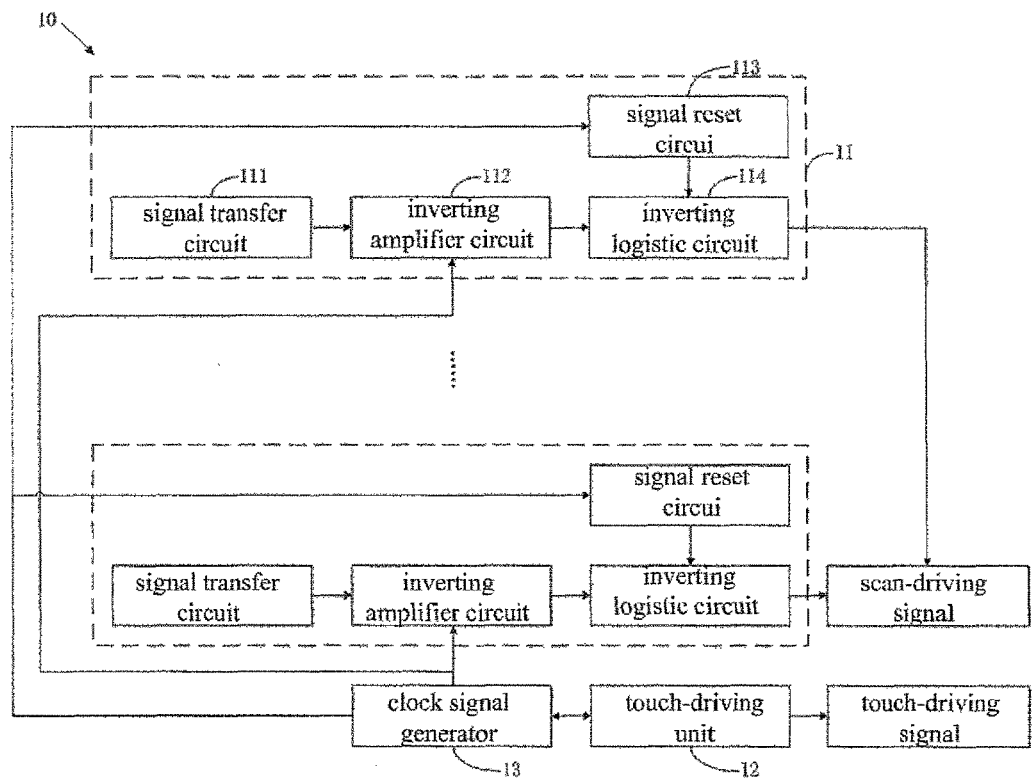
FIG. 1 is a structural diagram of a preferred embodiment of a scan-driving circuit of the present invention.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, units with similar structures are marked with the same labels.

Please refer to FIG. 1, which is a structural diagram of a preferred embodiment of a scan-driving circuit of the present invention. The scan-driving circuit is able to be used in touch liquid crystal display device, the scan-driving circuit 10 comprises a plurality of cascaded scan-driving units 11, a touch-driving unit 12, and a clock signal generator 13. The scan-driving units are used to output scanning signals, the touch-driving unit is used to output touch-driving signal, the clock signal generator is used to transmit a first clock signal XCK and a second clock signal CK.

Wherein the scan-driving unit 11 comprises a signal transfer circuit 111, an inverting amplifier circuit 112, a signal reset circuit 113, and an inverting logistic circuit 114. The signal transfer circuit 111 is used to receive a previous-one-stage cascaded signal or a next-one-stage cascaded signal, to generate a current-stage scanning-voltage signal according to a previous-one-stage cascaded signal or a next-one-stage cascaded signal. The inverting amplifier circuit 112 is connected with the signal transfer circuit 111, to generate a current-stage cascaded signal according to the first clock signal XCK and the current-stage scanning-voltage signal. The signal reset circuit 113 is connected with the inverting amplifier circuit 112, and used to perform a reboot operation on the scan-driving unit 11 according to a reboot signal RESET. The inverting logistic circuit 114 is connected with the signal reset circuit 113 and the inverting amplifier circuit 112, and used to generate a current-stage scan-driving signal according to the current-stage cascaded signal and the second clock signal CK. Wherein the first clock signal XCK and the second clock signal CK are inversed.

Figure 2:
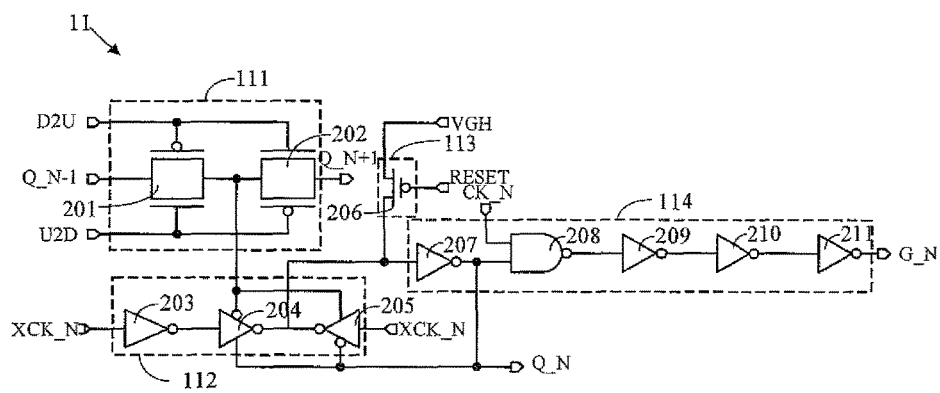
FIG. 2 is a structural diagram of a scan-driving unit of a preferred embodiment of a scan-driving circuit of the present invention.

FIG. 2 is a structural diagram of a scan-driving unit of a preferred embodiment of a scan-driving circuit of the present invention. Wherein the signal transfer circuit 111 comprises a first transmission gate 201 and a second transmission gate 202. A first control terminal of the first transmission gate 201 receives the backward scanning signal D2U, a second control terminal of the first transmission gate 201 receives the forward scanning signal U2D, an input terminal of the first transmission gate 201 receives a previous-one-stage cascaded signal Q_(N−1), and an output terminal of the first transmission gate 201 outputs the current-stage scan-driving signal. A first control terminal of the second transmission gate 202 receives the backward scanning signal D2U, a second control terminal of the second transmission gate 202 receives a forward scanning signal U2D, an input terminal of the second transmission gate 202 receives a next-one-stage cascaded signal Q_(N+1), an output terminal of the second transmission gate 202 outputs the current-stage scan-driving signal.

Hence, the signal transfer circuit 111 generates the current-stage scanning-voltage signal according to the previous-one-stage cascaded signal Q_(N−1) and the forward scanning signal U2D; or generates the current-stage scanning-voltage signal according to the previous-one-stage cascaded signal Q_(N+1) and the backward scanning signal the next-one-stage cascaded signal.

The first transmission gate 201 and the second transmission gate 202 may be CMOS (Complementary Metal Oxide Semiconductor). The first control terminal of the CMOS is a gate electrode of a PMOS (P-channel metal-oxide semiconductor) of the CMOS, and the second control terminal of the CMOS is a gate electrode of an NMOS (N-channel metal-oxide semiconductor). The input terminal of the CMOS is a source electrode of the PMOS and the NMOS; the output terminal of the CMOS is a drain electrode of the PMOS and the NMOS.

The inverting amplifier circuit 112 comprises a first inverter 203, a first inverting amplifier 204, and a second inverting amplifier 205. An input terminal of the first inverter 203 receives the first clock signal XCK, an output terminal of the first inverter 203 connects with a first input terminal of the first inverting amplifier 204, a second input terminal of the first inverting amplifier 204 is inputted with the current-stage scanning-voltage signal, in other words, the second input terminal of the first inverting amplifier 204 is connected with the output terminals of the first transmission gate 201 and the second transmission gate 202. A first output terminal of the second inverting amplifier 205 outputs the current-stage cascaded signal Q_N; a second output terminal of the second inverting amplifier 205 outputs an amplified current-stage scanning-voltage signal.

The signal reset circuit 113 comprises a first TFT 206, a control terminal of the first TFT 206 is inputted with a reset signal RESET, input terminal of the first TFT 206 connects with the high constant voltage VGH, an output terminal of the first TFT 206 connects with the inverting amplifier circuit 112 and the inverting logistic circuit 114, in other words, the output terminal of the first TFT 206 connects with the second output terminal of the first inverting amplifier 204 and the second output terminal of the second inverting amplifier 205. The first TFT 206 may be NMOS or COMS, the output terminal is a drain electrode, the input terminal is a source electrode, and the control terminal is a gate electrode.

The inverting logistic circuit 114 comprises a second inverter 207, a NAND gate 208, a third inverter 209, a fourth inverter 210, and a fifth inverter 211. An input terminal of the second inverter 207 connects with the signal reset circuit 113 and the output terminal of the inverting amplifier circuit 112, in other words, the input terminal of the second inverter 207 connects with the second output terminal of the first inverting amplifier 204, the second output terminal of the second inverting amplifier 205, and the output terminal of the first TFT 206, an output terminal of the second inverter 203 connects a first input terminal of the NAND gate 208; a second input terminal of the NAND gate 208 is inputted with the second clock signal CK, an output terminal of the NAND gate 208 connects with an input terminal of the third inverter 209, an output terminal of the third inverter 209 connects with an input terminal of the fourth inverter 210, an output terminal of the fourth inverter 210 connects with an input terminal of the fifth inverter 211, an output terminal of the fifth inverter 211 outputs the current-stage scan-driving signal G_N.

Figure 3:
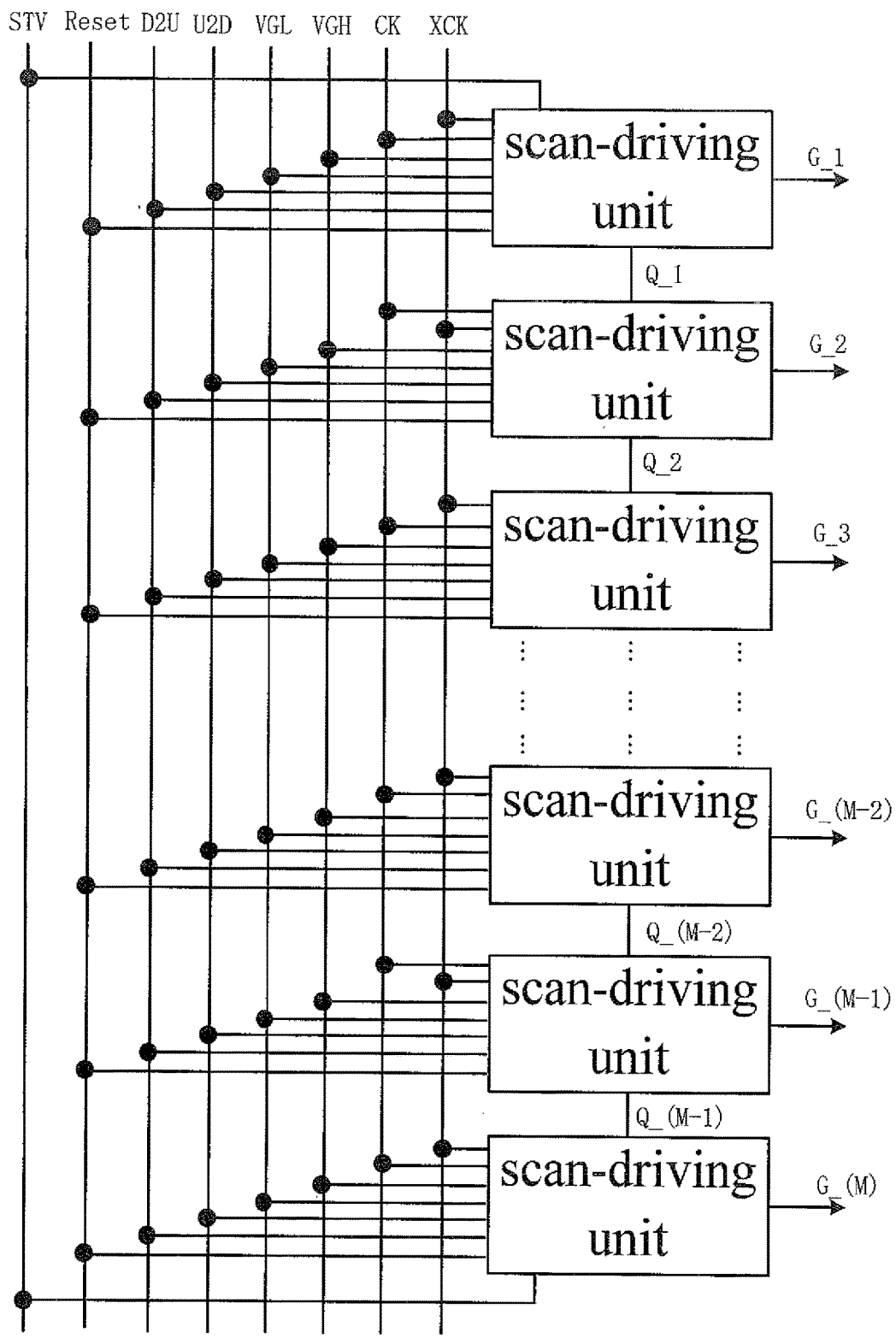
FIG. 3 is a structural diagram of a plurality of cascaded scan-driving unit of a preferred embodiment of a scan-driving circuit of the present invention.
Figure 4:
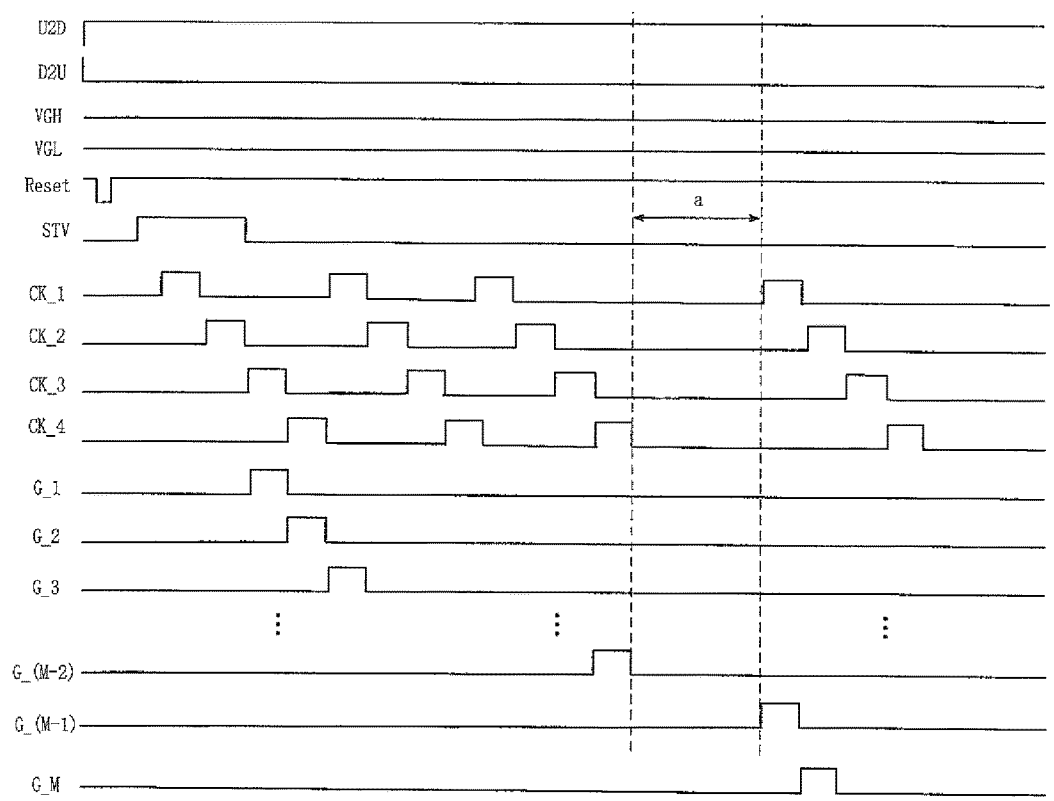
FIG. 4 is a pulse diagram of the scan-driving circuit of preferred embodiment of the present invention during actual operation.

FIG. 3 and FIG. 4 describe the actual operational theory of the scan-driving circuit of the preferred embodiment. FIG. 3 is a structural diagram of a plurality of cascaded scan-driving unit of a preferred embodiment of a scan-driving circuit of the present invention; FIG. 4 is a pulse diagram of the scan-driving circuit of preferred embodiment of the present invention during actual operation. In the preferred embodiment, every four of the first clock signals XCK and four of the second clock signals CK are a cycle, in other words, CK_N is the same as CK_N+4. Because the first clock signal XCK and the second clock signal CK are inversed, XCK_N is the same as XCK_N+4. The high constant voltage and the low constant voltage VHL are used to provide high voltage and low voltage to the scan-driving circuit. A starting impulse STV is used to initiate the scanning operation. The backward scanning signal D2U and the forward scanning signal U2D are responsible for the forward scanning and the backward scanning of the scan-driving circuit 10.

In the preferred embodiment, the scan-driving circuit 10 accomplishes the real-time switch of the scan-driving signals and the touch-driving signals. When the touch-scanning unit 12 outputs the touch-driving signal, the scan-driving unit 11 stops to output the scan-driving signal G_N by the first clock signal XCK and the second clock signal CK; when the touch-scanning unit 12 does not output the touch-driving signal G_N, the scan-driving unit 11 continues to output the scan-driving signal G_N by the first clock signal XCK and the second clock signal CK, time of touch-operation increases, the report rate and the touch sensitivity of the touch liquid crystal display device increases.

More precisely, a first scan-driving unit 11 of the scan-driving circuit 10 generates the scan-driving signal according to the staring impulse STV. As FIG. 3 and FIG. 4 show, the first scan-driving unit 11 generates a scan-driving signal G_1 and a current-stage cascaded signal Q_1, then transmits the current-stage cascaded signal Q_1 to the next-one-stage scan-driving unit 11. Hence, the next-one-stage scan-driving unit 11 can generate scan-driving signal according to the previous-one-stage cascaded signal.

As FIG. 4 shows, when the (M−2)th scan-driving unit 11 generates a scan-driving signal G_(M−2), the touch-driving unit 12 receives a touch-operation of a user applies to the touch liquid crystal display panel. Then, the touch-driving unit 12 controls the clock signal generator 13 to stop generating the first clock signal XCK and the second clock signal CK, a stop period is "a", and an (M−1)th scan-driving unit 11 can't generate a current-stage cascaded signal Q_(M−1). To generate a scan-driving signal G_(M−1), the scan-driving unit 11 stops the generation of the scan-driving signal. Hence, an influence on the touch-driving signal caused by the data signal is preventable, and to ensure the report rate and the touch sensitivity of the touch liquid crystal display panel.

When the user ends the touch-operation on the touch liquid crystal display panel, the touch-driving unit 12 controls the clock signal generator 13 to continue the transmission of the first clock signal XCK and the second clock signal CK before the stop operation, then the (M−1)th scan-driving unit generates the current-stage cascaded signal Q_(M−1) to generate the scan-driving signal G_(M−1), and the scan-driving unit 11 continues to output the scan-driving signal G_(M−1). This arrangement decreases the influence to the scan-driving signal caused by the touch-driving signal.

The scan-driving circuit 10 of the preferred embodiment is able to further perform a reset operation to a corresponding scan-driving unit 11 by the reset signal RESET, in other words, when the first TFT 206 is conducted, it is able to input a high voltage signal into the inverting logistic circuit 114, and to force input a low voltage signal to the NAND gate 208, in order to transform the scan-driving signal into low voltage and accomplish a reset operation of the scan-driving signal.

The scan-driving circuit of the preferred embodiment is able to perform forward scanning and backward scanning by the forward scanning signal and the backward scanning signal, and to control the stop and the continue of the scan-driving signal by the first clock signal and the second clock signal, which are generated by the clock signal generator. Hence, the report rate of the touch liquid crystal display device is better, the sensitivity of the touch-operation is higher, and the image quality is better.

The present invention further provides a touch liquid crystal display device, which comprises a scan-driving circuit, a touch panel, data lines, scanning lines, and pixel units disposed interleaved with the data lines and the scanning lines;

Wherein the scan-driving circuit comprises a plurality of cascaded scan-driving units being used to output scanning signals, a touch-driving unit being used to output touch-driving signal, and a clock signal generator being used to transmit a first clock signal and a second clock signal, wherein the scan-driving unit comprises:

A signal transfer circuit, used to receive a previous-one-stage cascaded signal or a next-one-stage cascaded signal, generated a current-stage scanning-voltage signal according to a previous-one-stage cascaded signal or a next-one-stage cascaded signal.

An inverting amplifier circuit, connected with the signal transfer circuit, used to generate a current-stage cascaded signal according to the first clock signal and the current-stage scanning-voltage signal.

A signal reset circuit, connected with the inverting amplifier circuit, and used to perform a reboot operation to the scan-driving units according to a reboot signal.

An inverting logistic circuit, connected with the signal reset circuit and the inverting amplifier circuit, used to generate a current-stage scan-driving signal according to the current-stage cascaded signal and the second clock signal;

Wherein when the touch-scanning unit outputs the touch-driving signal, the scan-driving unit stops to output the scan-driving signal by the first clock signal and the second clock signal; when the touch-scanning unit does not output the touch-driving signal, the scan-driving unit continues to output the scan-driving signal by the first clock signal and the second clock signal.

Preferably, when the scan-driving unit stops outputting the scan-driving signal, the clock signal generator continues the transmission of the first clock signal and the second clock signal before the stop operation, to output the scan-driving signal.

Preferably, when the scan-driving unit stops outputting the scan-driving signal, the clock signal generator continues the transmission of the first clock signal and the second clock signal before the stop operation, to output the scan-driving signal.

Preferably, the signal transfer circuit generates the current-stage scanning-voltage signal according to the previous-one-stage cascaded signal and a forward scanning signal; or the signal transfer circuit generates the current-stage scanning-voltage signal according to the previous-one-stage cascaded signal and a backward scanning signal the next-one-stage cascaded signal.

Preferably, the signal transfer circuit comprises a first transmission gate and a second transmission gate, a first control terminal of the first transmission gate receives the backward scanning signal, a second control terminal of the first transmission gate receives the forward scanning signal, and an input terminal of the first transmission gate receives a previous-one-stage cascaded signal, an output terminal of the first transmission gate outputs the current-stage scan-driving signal.

A first control terminal of the second transmission gate receives the backward scanning signal, a second control terminal of the second transmission gate receives the forward scanning signal, an input terminal of the second transmission gate receives a next-one-stage cascaded signal, an output terminal of the second transmission gate outputs the current-stage scan-driving signal.

Preferably, the inverting amplifier circuit comprises a first inverter, a first inverting amplifier, and a second inverting amplifier.

An input terminal of the first inverter receives the first clock signal, an output terminal of the first inverter connects with a first input terminal of the first inverting amplifier, a second input terminal of the first inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

A first input terminal of the second inverting amplifier receives the first clock signal, a second input terminal of the second inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

Preferably, the signal reset circuit comprises a first TFT, a control terminal of the first TFT is inputted with a reset signal, input terminal of the first TFT connects with the high constant voltage, and an output terminal of the first TFT connects with the inverting amplifier circuit and the inverting logistic circuit.

Preferably, the inverting logistic circuit comprises a second inverter, a NAND gate, a third inverter, a fourth inverter and a fifth inverter.

An input terminal of the second inverter connects with the signal reset circuit and the output terminal of the inverting amplifier circuit, and an output terminal of the second inverter connects a first input terminal of the NAND gate; a second input terminal of the NAND gate is inputted with the second clock signal, an output terminal of the NAND gate connects with an input terminal of the third inverter, an output terminal of the third inverter connects with an input terminal of the fourth inverter, an output terminal of the fourth inverter connects with an input terminal of the fifth inverter, an output terminal of the fifth inverter outputs the current-stage scan-driving signal.

Preferably, the first clock signal and the second clock signal are inversed.

The scan-driving circuit and touch liquid crystal device of the present invention raises the report rate of the touch liquid crystal display device and the sensitivity of the touch-operation, by a discontinuity-operation of the first clock signal and the second clock signal, solving the technical problem of lower report rate and lower touch sensitivity of the scan-driving circuit and touch liquid crystal device of the conventional art.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A touch liquid crystal display device, comprising:
   a scan-driving circuit, a touch panel, data lines, scanning lines and pixel units, wherein the pixel units are disposed interleaved with the data lines and the scanning lines, wherein the scan-driving circuit comprises a plurality of cascaded scan-driving units configured to output scanning signals, a touch-driving unit configured to output touch-driving signal, and a clock signal generator configured to generate a first clock signal and a second clock signal,
   wherein the scan-driving unit further comprises a signal transfer circuit, configured to receive a previous-one-stage cascaded signal or a next-one-stage cascaded signal, and configured to generate a current-stage scanning-voltage signal according to a previous-one-stage cascaded signal or a next-one-stage cascaded signal;
   an inverting amplifier circuit configured to generate a current-stage cascaded signal according to the first clock signal and the current-stage scanning-voltage signal, wherein the inverting amplifier circuit is connected with the signal transfer circuit;
   a signal reset circuit configured to perform a reboot operation to the scan-driving units according to a reboot signal, wherein the signal reset circuit is connected with the inverting amplifier circuit; and an inverting logistic circuit configured to generate a current-stage scan-driving signal according to the current-stage cascaded signal and the second clock signal, wherein the inverting logistic circuit is connected with the signal reset circuit and the inverting amplifier circuit,
   wherein when the touch-scanning unit outputs the touch-driving signal, the scan-driving unit stops to output the scan-driving signal according to the first clock signal and the second clock signal;
   when the touch-scanning unit does not output the touch-driving signal, the scan-driving unit continues to output the scan-driving signal according to the first clock signal and the second clock signal,
   wherein when the scan-driving unit stops outputting the scan-driving signal, the clock signal generator continues to output the scan-driving signal by recovering the transmission of the first clock signal and the second clock signal,
   wherein the signal transfer circuit comprises a first transmission gate and a second transmission gate, a first control terminal of the first transmission gate receives the backward scanning signal, a second control terminal of the first transmission gate receives the forward scanning signal, and an input terminal of the first transmission gate receives a previous-one-stage cascaded signal, and an output terminal of the first transmission gate outputs the current-stage scan-driving signal; a first control terminal of the second transmission gate receives the backward scanning signal, a second control terminal of the second transmission gate receives the forward scanning signal, an input terminal of the second transmission gate receives a next-one-stage cascaded signal, and an output terminal of the second transmission gate outputs the current-stage scan-driving signal, and
   wherein the inverting amplifier circuit comprises a first inverter, a first inverting amplifier, and a second inverting amplifier; an input terminal of the first inverter receives the first clock signal, an output terminal of the first inverter connects with a first input terminal of the first inverting amplifier, a second input terminal of the first inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal;
   a first input terminal of the second inverting amplifier receives the first clock signal, a second input terminal of the second inverting amplifier is inputted with the current-stage scanning-voltage signal; a first output terminal of the second inverting amplifier outputs the current-stage cascaded signal; a second output terminal of the second inverting amplifier outputs an amplified current-stage scanning-voltage signal.

2. The touch liquid crystal display device according to claim 1, wherein when the scan-driving unit stops outputting the scan-driving signal, the clock signal generator continues to output the scan-driving signal by recovering the transmission of the first clock signal and the second clock signal.

3. The touch liquid crystal display device according to claim 1, wherein the signal transfer circuit generates the current-stage scanning-voltage signal according to the previous-one-stage cascaded signal and a forward scanning signal; or the signal transfer circuit generates the current-stage scanning-voltage signal according to the previous-one-stage cascaded signal and a backward scanning signal the next-one-stage cascaded signal.

4. The touch liquid crystal display device according to claim 1, wherein the signal reset circuit comprises a first TFT, a control terminal of the first TFT is inputted with a reset signal, input terminal of the first TFT connects with the high constant voltage, an output terminal of the first TFT connects with the inverting amplifier circuit and the inverting logistic circuit.

5. The touch liquid crystal display device according to claim 1, wherein the inverting logistic circuit comprises a second inverter, a NAND gate, a third inverter, a fourth inverter, and a fifth inverter; an input terminal of the second inverter connects with the signal reset circuit and the output terminal of the inverting amplifier circuit, and an output terminal of the second inverter connects a first input terminal of the NAND gate; a second input terminal of the NAND gate is inputted with the second clock signal, an output terminal of the NAND gate connects with an input terminal of the third inverter, an output terminal of the third inverter connects with an input terminal of the fourth inverter, an output terminal of the fourth inverter connects with an input terminal of the fifth inverter, an output terminal of the fifth inverter outputs the current-stage scan-driving signal.

6. The touch liquid crystal display device according to claim 1, the first clock signal and the second clock signal are inversed.

* * * * *